United States Patent
Zhang

(10) Patent No.: US 11,962,423 B2
(45) Date of Patent: Apr. 16, 2024

(54) METHOD AND APPARATUS, UE, AND BASE STATION FOR SCHEDULING-FREE RETRANSMISSION FOR A CODE BLOCK GROUP

(71) Applicant: BEIJING UNISOC COMMUNICATIONS TECHNOLOGY CO., LTD., Beijing (CN)

(72) Inventor: Sa Zhang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 510 days.

(21) Appl. No.: 17/267,338

(22) PCT Filed: Jul. 19, 2019

(86) PCT No.: PCT/CN2019/096785
§ 371 (c)(1),
(2) Date: Feb. 9, 2021

(87) PCT Pub. No.: WO2020/029773
PCT Pub. Date: Feb. 13, 2020

(65) Prior Publication Data
US 2021/0242980 A1  Aug. 5, 2021

(30) Foreign Application Priority Data
Aug. 10, 2018 (CN) .......................... 201810914055.1

(51) Int. Cl.
*H04L 1/18* (2023.01)
*H03M 13/00* (2006.01)
(Continued)

(52) U.S. Cl.
CPC ........... *H04L 1/1896* (2013.01); *H04W 72/21* (2023.01); *H04W 72/23* (2023.01); *H04W 74/08* (2013.01)

(58) Field of Classification Search
CPC ... H04L 1/1607; H04L 1/1812; H04L 1/1822; H04L 1/1887; H04L 1/1896;
(Continued)

(56) References Cited

U.S. PATENT DOCUMENTS 11,224,056 B2 * 1/2022 Chakraborty ......... H04L 1/1614
11,405,150 B2 * 8/2022 Myung ................. H04W 72/23
(Continued)

FOREIGN PATENT DOCUMENTS

CN  103312468 A  9/2013
CN  106888074 A  6/2017
(Continued)

OTHER PUBLICATIONS

Qualcomm Incorporated. "Enhancement to configured grants in NR unlicensed" *3GPP TSG RAN WG1 Meeting* #93 R1-1807392, May 25, 2018 (May 25, 2018), sections 1 and 3.
(Continued)

*Primary Examiner* — Justin R Knapp
(74) *Attorney, Agent, or Firm* — Harness, Dickey & Pierce, P.L.C.

(57) ABSTRACT

UE, base station and data transmission method and apparatus. The method includes: in an unlicensed frequency band of 5G NR, a UE transmitting uplink data and associated UCI to a base station through AUL transmission; the base station identifying the UE through UE specific DMRS; the base station decoding the UCI; if the UCI is successfully decoded, the base station decoding the uplink data; based on whether a transport block or CBG is successfully decoded, the base station transmitting DFI to the UE, the DFI includ-
(Continued)

initial transmission retransmission of CBG0 ing first information used to indicate a location of the successfully decoded CBG; the UE receiving the DFI; the UE using the first information to determine HARQ-ID of a transport block where the CBG that needs to be retransmitted is located, and a sequence number of the CBG in a HARQ of the transport block where the CBG is located; the UE performing scheduling-free retransmission.

15 Claims, 5 Drawing Sheets

(51) Int. Cl.
    *H04L 1/00*         (2006.01)
    *H04L 1/1867*    (2023.01)
    *H04W 72/21*     (2023.01)
    *H04W 72/23*     (2023.01)
    *H04W 74/08*     (2009.01)

(58) Field of Classification Search
    CPC .... H04L 1/1614; H04L 1/1671; H04W 28/04; H04W 72/1268; H04W 72/1284; H04W 72/1289; H04W 74/08; H04W 74/0808; H04W 721/21; H04W 72/23
    See application file for complete search history.

(56) References Cited

U.S. PATENT DOCUMENTS 11,523,422 B2 * 12/2022 Golitschek Edler von Elbwart ... H04L 1/1896
2017/0230149 A1 * 8/2017 Wang .................. H04L 1/1614
2018/0145703 A1    5/2018 Li et al.
2019/0349965 A1 * 11/2019 Chakraborty ......... H04W 16/14

FOREIGN PATENT DOCUMENTS

CN        107196740 A     9/2017
CN        107483160 A    12/2017
WO   WO-2017-136244 A1   8/2017

OTHER PUBLICATIONS

LG Electronics. "Discussion on configured grant for NR unlicensed operation" *3GPP TSG RAN WG1 Meeting #93* R1-1806648, May 25, 2018 (May 25, 2018), entire document.

LG Electronics. "Consideration on UCI signaling for CBG based HARQ" *3GPP TSG RAN WG1 Meeting NR Ad-Hoc#2* R1-1710331, Jun. 30, 2017 (Jun. 30, 2017), entire document.

International Search Report (English and Chinese) and Written Opinion (Chinese) of the International Searching Authority issued in PCT/CN2019/096785, dated Oct. 18, 2019; ISA/CN.

Extended European Search Report regarding Application No. 19848564, dated Apr. 8, 2022.

Huawei et al: "Remaining issues for AUL HARQ operation", [Online] Nov. 17, 2017 (Nov. 17, 2017), 3GPP Draft; RI-1719499, 3rd Generation Partnership Project (3GPP), Mobile Competence Centre; 650, Route Des Lucioles; F-06921 Sophia-Antipolis Cedex; France, XP051368807, Retrieved from the Internet: URL:http://www.3gpp.org/ftp/tsg%5Fran/WG1%5FRL1/TSGR1%5F91/Docs/> [retrieved on Nov. 17, 2017].

* cited by examiner

METHOD AND APPARATUS, UE, AND BASE STATION FOR SCHEDULING-FREE RETRANSMISSION FOR A CODE BLOCK GROUP

CROSS-REFERENCE TO RELATED APPLICATIONS

This application is the national phase of International Application No. PCT/CN2019/096785, filed on Jul. 19, 2019, which claims the benefit of priority to Chinese Patent Application No. 201810914055.1, filed on Aug. 10, 2018, and entitled "UE, BASE STATION, AND DATA TRANSMISSION METHOD AND APPARATUS". The entire disclosures of the above applications are expressly incorporated by reference herein.

TECHNICAL FIELD

The present disclosure generally relates to radio communication technology field, and more particularly, to a User Equipment (UE), a base station, and a data transmission method and apparatus.

BACKGROUND

5G New Radio (NR) is a global 5G standard of new radio based on OFDM (Orthogonal Frequency Division Multiplexing (OFDM) technology, and is also the basis for the next generation of cellular mobile communication technology. 5G NR possess many advantages such as lower latency and higher reliability. Recently, the international standards organization Third Generation Partnership Project (3GPP) plenary meeting has approved an independent networking standard for 5G NR.

Hybrid Automatic Repeat reQuest (HARQ) is a technology that combines Forward Error Correction (FEC) and Automatic Repeat reQuest (ARQ) methods. By adding redundant information, FEC enables a receiver to correct some errors, thereby reducing the number of retransmissions. For errors that cannot be corrected by FEC, the receiver may request a transmitter to retransmit data through ARQ. The receiver uses an error detection code, generally a Cyclic Redundancy Check (CRC) code, to detect whether a received data packet is correct. If there is no error, the receiver may transmit a positive ACKnowledgement (ACK) to the transmitter. After receiving the ACK, the transmitter may transmit a next data packet. If there is an error, the receiver may discard the data packet and transmit a Negative ACKnowledgement (NACK) to the transmitter. After receiving the NACK, the transmitter may retransmit the same data.

In LTE Further Enhanced Licensed-Assisted Access (feLAA), Autonomous UpLink (AUL) transmission is introduced. When performing AUL transmission, a User Equipment (UE) does not need to transmit a scheduling request (SR) first, and directly transmits uplink data on a time-frequency resource pre-allocated by AUL after a Listen Before Talk (LBT) succeeds. AUL transmission significantly reduces latency.

In AUL transmission, due to the uncertainty of LBT, the base station's HARQ-ACK feedback for AUL is also uncertain. After the UE receives the HARQ-ACK feedback of NACK from the base station, a retransmission time of a certain Transport Block (TB) is also uncertain.

AUL-DFI (Downlink Feedback Information) is defined in feLAA to feedback AUL data, and a bitmap is used in AUL-DFI to feedback all HARQ processes.

When performing AUL transmission, the base station may configure a HARQ-ID set that can be used for AUL transmission. The UE selects a HARQ-ID from the set, determines New Data Indicator (NDI) and Redundancy Version (RV), and informs the base station through Uplink Control Information (UCI) which also includes UE-ID. UCI are transmitted to the base station together with AUL Physical Uplink Shared Channel (PUSCH). After receiving the UCI and the PUSCH, the base station decodes the UCI first, learns information including the UE-ID, HARQ-ID, NDI and RV through the UCI, and then decodes the PUSCH.

AUL supports two retransmission methods including scheduling-based retransmission and AUL retransmission. The scheduling-based retransmission means that when the UE receives an uplink scheduling (UL grant), and HARQ-ID, TBS and NDI indicated by the UL grant are completely consistent with a previous AUL transmission, the UE may perform scheduling-based retransmission of a transport block on a time-frequency resource indicated by the UL grant. The AUL retransmission (that is, non-scheduling retransmission) means that if the UE receives AUL-DFI indicating that a certain HARQ process is NACK, or no UL grant information or AUL-DFI is received from any base station within a time period after a transmission block of a certain HARQ process is transmitted, the UE may adopt the AUL retransmission.

LTE usually adopts a single-bit HARQ-ACK feedback scheme. For eMBB services, for high-rate transmission, the number of bits in each transmission block is relatively large. The number of Code Blocks (CB) in each transmission block may be several times that of LTE. If the single-bit HARQ-ACK feedback scheme of LTE is adopted, in a case of poor channel quality or in a scenario where Enhanced Mobile Broadband (eMBB) and Ultra Reliable Low Latency Communication (URLLC) are multiplexed, the eMBB service is preempted by the URLLC service, causing errors to some code blocks and further causing decoding errors. Consequently, the entire transmission block needs to be retransmitted, which results in a serious decrease in data throughput and spectral efficiency.

To improve spectrum efficiency, Code Block Group (CBG) retransmission is introduced in 5G. A CBG HARQ-ACK feedback scheme is adopted to divide a transmission block into several CBGs each of which includes one or more code blocks. When a portion of the code blocks in a transmission block is in error, merely the CBG where the error code blocks are located is retransmitted instead of the entire transmission block.

If the UE is configured with Radio Resource Control (RRC) parameter codeBlockGroupTransmission in a certain serving cell, and a maximum number $N_{HARQ\text{-}ACK}^{CBG/TB,max}$ of CBGs included in the transmission block of the serving cell is configured through RRC parameter maxCodeBlockGroupsPerTransportBlock, the UE needs to feed back $N_{HARQ\text{-}ACK}^{CBG/TB,max}$ HARQ-ACK bits.

As for the number of code blocks included in one transmission block is C, the UE determines that the number of CBGs based on a formula $N_{HARQ\text{-}ACK}^{CBG/TB}=\min(N_{HARQ\text{-}ACK}^{CBG/TB,max},C)$. The first $N_{HARQ\text{-}ACK}^{CBG/TB,1}=\mod(C,N_{HARQ\text{-}ACK}^{CBG/TB})$ CBGs include $\lceil C/N_{HARQ\text{-}ACK}^{CBG/TB}\rceil$ code blocks, where CBG $n_{CBG}$, $0\le n_{CBG}<N_{HARQ\text{-}ACK}^{CBG/TB,1}$ includes $n_{CBG}\cdot\lceil C/N_{HARQ\text{-}ACK}^{CBG/TB}\rceil+n_{CB}$, $0\le n_{CB}<\lceil C/N_{HARQ\text{-}ACK}^{CBG/TB}\rceil$ code blocks, and the latter $N_{HARQ\text{-}ACK}^{CBG/TB,2}=$ $N_{HARQ-ACK}^{CBG/TB}$ -mod(C, $N_{HARQ-ACK}^{CBG/TB}$) CBGs include $\lceil C/N_{HARQ-ACK}^{CBG/TB} \rceil$ code blocks, where CBG $n_{CBG}$, $N_{HARQ-ACK}^{CBG/TB,1} \le n_{CBG} < N_{HARQ-ACK}^{CBG/TB,1} + N_{HARQ-ACK}^{CBG/TB,2}$ includes $N_{HARQ-ACK}^{CBG/TB,1} \cdot \lceil C/N_{HARQ-ACK}^{CBG/TB} \rceil + (n_{CBG} - N_{HARQ-ACK}^{CBG/TB,1}) \cdot \lfloor C/N_{HARQ-ACK}^{CBG/TB} \rfloor + n_{CB}$, $0 \le n_{CB} < \lfloor C/N_{HARQ-ACK}^{CBG/TB} \rfloor$ code blocks. The UE uses $N_{HARQ-ACK}^{CBG/TB,1} + N_{HARQ-ACK}^{CBG/TB,2}$ HARQ-ACK information bits to feed back $N_{HARQ-ACK}^{CBG/TB,1} + N_{HARQ-ACK}^{CBG/TB,2}$ CBGs in a 1-to-1 manner. If receiving two transmission blocks, the UE feeds back HARQ-ACKs of the two transmission blocks together, where a first bit corresponds to the first transmission block, and the latter bit corresponds to the second transmission block.

The CBG in a retransmitted transport block is the same as the CB included in the corresponding CBG in an initial transmission block.

If RRC parameter HARQ-ACK-codebook of the UE is semi-static, a HARQ-ACK codebook includes HARQ-ACK $N_{HARQ-ACK}^{CBG/TB,max}$ information bits. For a certain transport block, if $N_{HARQ-ACK}^{CBG/TB} < N_{HARQ-ACK}^{CBG/TB,max}$, the UE may transmit an NACK at the last $N_{HARQ-ACK}^{CBG/TB,max} - N_{HARQ-ACK}^{CBG/TB}$ information bits.

If the UE receives a Physical Downlink Shared CHannel (PDSCH) that is scheduled by DCI format 1_0, the UE merely generates HARQ-ACK information for the transport block in the PDSCH.

If the UE is not configured with RRC parameter codeBlockGroupTransmission, the UE may generate one bit of HARQ-ACK information for each transmission block.

In a schematic diagram of a CBG retransmission mechanism as shown in FIG. 1, for downlink transmission, RRC parameter CBG-DL of the UE in a certain serving cell is ON. When the UE configures a maximum number $N_{HARQ-ACK}^{CBG/TB,max}$ of the CBGs included in the transmission block of the serving cell to be 4 through RRC parameter maxCodeBlockGroupsPerTransportBlock, the UE needs to feed back 4 HARQ-ACK bits.

In FIG. 1, a transmission block is composed of 10 code blocks, numbered as 0, 1, 2, . . . , 9, respectively. The number of code blocks is greater than $N_{HARQ-ACK}^{CBG/TB,max}$, and these 10 code blocks are divided into 4 CBGs, where CBG0 and CBG1 each include 3 code blocks, and CBG2 and CBG3 each include 2 code blocks. When CB0 is decoded incorrectly and other code blocks are decoded correctly, the HARQ-ACK fed back by the UE is 0111, and after successfully decoding the HARQ-ACK fed back by the UE, the base station merely retransmits the CBG where CB0 is located, i.e., CBG0. Merely the code blocks (CB0, CB1, CB2) included in CBG0 need to be retransmitted. CBG retransmission and initial transmission use a same CBG grouping method.

At present, 5G NR also operates on standardization of unlicensed bands. Similar to LTE feLAA, 5G NR may also use a scheduling-free mode to transmit a PUSCH. The unlicensed bands of 5G NR is used on an NR configured grant base station to study scheduling-free uplink transmission.

Like LTE feLAA, in the unlicensed bands of 5G NR, HARQ process ID, NDI and Redundancy Version IDentity (RVID) are notified to the base station through UCI, and the unlicensed bands of 5G NR also supports DFI to feedback uplink data. Unlike LTE feLAA, the unlicensed bands of 5G NR do not contain UEID information in the UCI. The UEID is distinguished by UE specific Demodulation Reference Signal (DMRS) in the unlicensed bands of 5G NR, where UE specific DMRS is a user-specific reference signal in 5G NR.

It should be noted that a transport block has a corresponding HARQ-ID during transmission, and is divided into multiple CBGs.

SUMMARY

Embodiments of the present disclosure provide a solution for obtaining an IR gain in an unlicensed frequency band of 5G NR for a data transmission mode of AUL transmission (especially for a CBG-level feedback method in a case where the number of DFI bits is limited).

In an embodiment of the present disclosure, a data transmission method is provided, including: in an unlicensed frequency band of 5G NR, a UE transmitting uplink data and associated UCI to a base station through AUL transmission; the base station identifying the UE through UE specific DMRS; the base station decoding the UCI; if the UCI is successfully decoded, the base station decoding the uplink data; based on whether a transport block or a CBG is successfully decoded, the base station transmitting DFI to the UE, wherein the DFI includes first information that is used to indicate a location of the successfully decoded CBG; the UE receiving the DFI; the UE using the first information to determine HARQ-ID of a transport block where the CBG that needs to be retransmitted is located, and a sequence number of the CBG that needs to be retransmitted in a HARQ of the transport block where the CBG that needs to be retransmitted is located; and the UE performing scheduling-free retransmission.

Optionally, the first information includes: a transport block level HARQ-ACK feedback, and a CBG-level HARQ-ACK feedback of a transport block or a transport block group where the CBG that fails to be decoded is located, wherein the transport block group includes one or more transport blocks.

Optionally, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

Optionally, before transmitting uplink data and associated UCI to a base station through AUL transmission, the method further includes performing LBT and succeeding in the LBT.

Optionally, the UCI includes HARQ-ID, NDI and RVID associated with the uplink data.

In an embodiment of the present disclosure, a data transmission method is provided, including: in an unlicensed frequency band of 5G NR, transmitting uplink data and associated UCI to a base station through AUL transmission, wherein the base station is capable of identifying a UE transmitting the uplink data through UE specific DMRS; receiving DFI which includes first information; using the first information to determine HARQ-ID of a transport block where a CBG that needs to be retransmitted is located, and a sequence number of the CBG that needs to be retransmitted in a HARQ of the transport block where the CBG that needs to be retransmitted is located; and performing scheduling-free retransmission.

Optionally, the first information includes: a transport block level HARQ-ACK feedback, and a CBG-level HARQ-ACK feedback of a transport block or a transport block group where the CBG that fails to be decoded is located, wherein the transport block group includes one or more transport blocks.

Optionally, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

Optionally, before transmitting uplink data and associated UCI to a base station through AUL transmission, the method further includes performing LBT and succeeding in the LBT.

Optionally, the UCI includes HARQ-ID, NDI and RVID associated with the uplink data.

In an embodiment of the present disclosure, a data transmission method is provided, including: in an unlicensed frequency band of 5G NR, receiving uplink data and associated UCI from a UE through AUL transmission; identifying the UE through UE specific DMRS; decoding the UCI; if the UCI is successfully decoded, decoding the uplink data; and based on whether a transport block or a CBG is successfully decoded, transmitting DFI to the UE, wherein the DFI includes first information, and the UE is capable of using the first information to determine HARQ-ID of a transport block where the CBG that needs to be retransmitted is located, and a sequence number of the CBG that needs to be retransmitted in a HARQ of the transport block where the CBG that needs to be retransmitted is located.

Optionally, the first information includes: a transport block level HARQ-ACK feedback, and a CBG-level HARQ-ACK feedback of a transport block or a transport block group where the CBG that fails to be decoded is located, wherein the transport block group includes one or more transport blocks.

Optionally, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

Optionally, before transmitting the uplink data and the associated UCI to the base station through AUL transmission, the UE further performs LBT and succeeds in the LBT.

Optionally, the UCI includes HARQ-ID, NDI and RVID associated with the uplink data.

In an embodiment of the present disclosure, a data transmission apparatus is provided, including: an uplink data transmitting circuitry configured to: in an unlicensed frequency band of 5G NR, transmit uplink data and associated UCI to a base station through AUL transmission, wherein the base station is capable of identifying a UE transmitting the uplink data through UE specific DMRS; a downlink data receiving circuitry configured to receive DFI which includes first information; an analyzing circuitry configured to use the first information to determine HARQ-ID of a transport block where a CBG that needs to be retransmitted is located, and a sequence number of the CBG that needs to be retransmitted in a HARQ of the transport block where the CBG that needs to be retransmitted is located; and an uplink data retransmitting circuitry configured to perform scheduling-free retransmission.

Optionally, the first information includes: a transport block level HARQ-ACK feedback, and a CBG-level HARQ-ACK feedback of a transport block or a transport block group where the CBG that fails to be decoded is located, wherein the transport block group includes one or more transport blocks.

Optionally, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

Optionally, before the uplink data and the associated UCI are transmitted to the base station through AUL transmission, LBT is performed and succeeds.

Optionally, the UCI includes HARQ-ID, NDI and RVID associated with the uplink data.

In an embodiment of the present disclosure, a data transmission apparatus is provided, including: an uplink data receiving circuitry configured to: in an unlicensed frequency band of 5G NR, receive uplink data and associated UCI from a UE through AUL transmission; an identifying circuitry configured to identify the UE through UE specific DMRS; a decoding circuitry configured to: decode the UCI, and if the UCI is successfully decoded, decode the uplink data; and an indicating circuitry configured to: based on whether a transport block or a CBG is successfully decoded, transmit DFI to the UE, wherein the DFI includes first information, and the UE is capable of using the first information to determine HARQ-ID of a transport block where the CBG that needs to be retransmitted is located, and a sequence number of the CBG that needs to be retransmitted in a HARQ of the transport block where the CBG that needs to be retransmitted is located.

Optionally, the first information includes: a transport block level HARQ-ACK feedback, and a CBG-level HARQ-ACK feedback of a transport block or a transport block group where the CBG that fails to be decoded is located, wherein the transport block group includes one or more transport blocks.

Optionally, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

Optionally, before transmitting the uplink data and the associated UCI to the base station through AUL transmission, the UE further performs LBT and succeeds in the LBT.

Optionally, the UCI includes HARQ-ID, NDI and RVID associated with the uplink data.

In an embodiment of the present disclosure, a UE is provided, wherein the UE supports an unlicensed frequency band of 5G NR and includes the above data transmission apparatus.

In an embodiment of the present disclosure, a base station is provided, wherein the base station supports an unlicensed frequency band of 5G NR and includes the above data transmission apparatus.

Embodiments of the present disclosure may provide following advantages.

In embodiments of the present disclosure, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

DETAILED DESCRIPTION

In a case that UCI is decoded correctly, a base station uses a bit in DFI to inform a UE. When receiving this indication, the UE may select a same RV as a previous transmission for a scheduling-free retransmission of PUCSH with NACK feedback. If the DFI indicates that no retransmission is required, the UE may select other RV versions to obtain an IR gain.

When an uplink scheduling-free transmission in an unlicensed frequency band of 5G NR is configured with CBG transmission, the base station can feed back a CBG-level HARQ-ACK in the DFI, and the UE can determine a CBG that needs to be retransmitted through a HARQ-ACK feedback of the CBG of the DFI, thereby improving spectrum utilization.

A problem encountered is that for a scenario of one transport block in feLAA, AUL-DFI includes 16-bit HARQ-ACK Bitmap and 2-bit Transmit Power Control (TPC). The DFI in the unlicensed frequency band of 5G NR must at least include this information. When the uplink scheduling-free transmission in the unlicensed frequency band of 5G NR supports CBG, DFI should also introduce CBG-level feedback. Each transport block in the unlicensed frequency band of 5G NR can be configured with a maximum of 8 CBGs, and 16 HARQ requires 128 bits for feedback.

However, the number of DFI bits in the unlicensed frequency band of 5G NR is limited (it may need to be multiplexed with a certain DCI format to reduce complexity of blind detection of the UE), and cannot be expanded without limitation.

In embodiments of the present disclosure, a CBG-level feedback method is provided for a case that the number of DFI bits is limited. The base station uses decodes the uplink data in the case of successful UCI decoding. Based on whether the decoding of a transmission block or a CBG is successful, the base station transmits DFI to the UE, where the DFI includes first information used to indicate a location of the successfully decoded CBG, so as to achieve scheduling-free retransmission.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

In order to clarify the objects, characteristics and advantages of the disclosure, embodiments of present disclosure will be described in detail in conjunction with accompanying drawings.

As described below, an embodiment of the present disclosure provides a data transmission method.

First, the data transmission method in the embodiment is applicable to an unlicensed frequency band of 5G NR, where a base station and a UE perform data transmission through AUL transmission.

Figure 1:
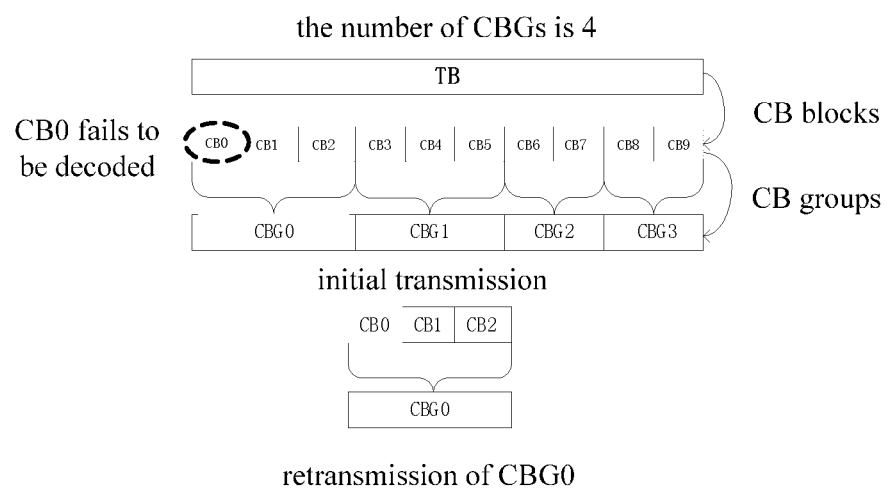
FIG. 1 is a diagram of a CBG retransmission mechanism mentioned in the background.
Figure 2:
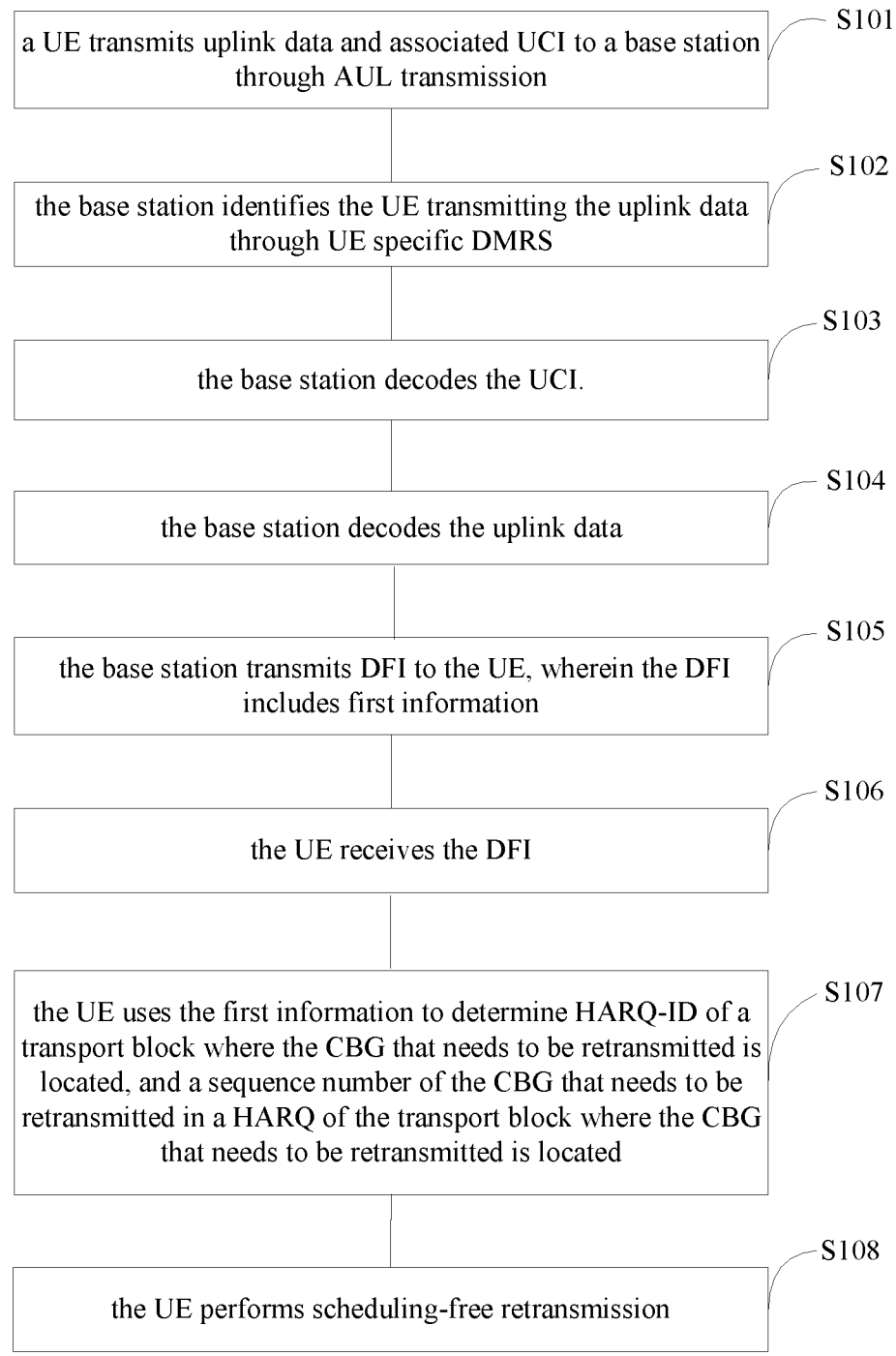
FIG. 2 is a flow chart of a data transmission method according to an embodiment.

Referring to the flow chart of the data transmission method as shown in FIG. 2, detailed descriptions are given through specific steps below.

In S101, a UE transmits uplink data and associated UCI to a base station through AUL transmission.

In an unlicensed frequency band of 5G NR, the UE transmits uplink data and associated UCI to the base station through AUL transmission.

The UCI includes HARQ-ID, NDI and RVID associated with the uplink data.

Before transmitting the uplink data and the associated UCI to the base station through AUL transmission, the UE further performs LBT and succeeds in the LBT.

In the unlicensed frequency band of 5G NR, after performing LBT and succeeding in the LBT, the UE transmits the uplink data in a scheduling-free manner on a pre-configured resource. The HARQ-ID, NDI, and RVID associated with the data may be reported in the UCI at the same time, and the UCI may piggyback to PUSCH to transmit. The UE may activate a timer after the data is transmitted.

In S102, the base station identifies the UE transmitting the uplink data through UE specific DMRS.

After receiving the uplink data and control information from the UE, the base station obtains an UE-ID of the UE transmitting the uplink data through UE specific DMRS.

In S103, the base station decodes the UCI.

The base station obtains HARQ-ID, NDI, and RVID by decoding UCI.

The base station uses one bit in the DFI to inform the UE whether the decoding is successful.

In a case that the UCI is not successfully decoded, S104 is performed.

In S104, the base station decodes the uplink data.

The base station decodes the uplink data. Based on whether the decoding of the transport block or CBG is successful, the DFI may include a transport block-level HARQ-ACK feedback and/or a CBG-level HARQ-ACK feedback in subsequent S105. In a case of successful decoding of UCI, the transport block-level HARQ-ACK feedback and/or the CBG-level HARQ-ACK feedback are no longer required.

Of course, there is possibility of not transmitting HARQ-ID scheduling information or HARQ-ACK feedback information associated with the data to the UE. In this case, if the UE does not receive an ACK feedback or scheduling information associated with the HARQ-ID after the timer expires, the UE may retransmit the data in a scheduling-free manner.

In S105, the base station transmits DFI to the UE, wherein the DFI includes first information.

If the UCI is not successfully decoded, the base station transmits DFI to the UE, wherein the DFI includes first information.

The first information is used to indicate a location of the successfully decoded CBG.

The first information includes: a transport block level HARQ-ACK feedback, and a CBG-level HARQ-ACK feedback of a transport block or a transport block group where the CBG that fails to be decoded is located, wherein the transport block group includes one or more transport blocks.

In some embodiments, the first information may not include a CBG-level HARQ-ACK feedback of a HARQ or a HARQ group of transport blocks or transport block groups that all included CBGs are successfully decoded.

There are various ways for the base station to indicate the data to be retransmitted.

As mentioned above, in the unlicensed frequency band of 5G NR, after succeeding in LBT, the UE may transmit the uplink data in a scheduling-free manner on the pre-configured resource. The HARQ-ID, NDI and RVID associated with the data are reported in the UCI at the same time, and the UCI may piggyback to PUSCH to transmit. The UE may activate a timer after the data is transmitted. After receiving the uplink data and control information from the UE, the base station obtains the UE-ID through UE specific DMRS, and then obtains HARQ-ID, NDI and RVID by decoding the UCI. When the UCI is not successfully decoded, an NACK may be fed back through the DFI to the HARQ-ID that has not been successfully decoded, and one bit in the DFI is used to indicate that the UE has failed to decode the UCI (or indicate that the UE transmits a same RV version as the previous transmission during the scheduling-free retransmission).

If the UE does not receive an ACK feedback or scheduling information associated with a HARQ-ID after a timer associated with the HARQ-ID expires, the UE may retransmit the data in a scheduling-free manner.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 1, and HARQ-ID of a PUSCH transmitted in slot 2 is 2. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 1, the scheduling-free retransmission timer starts from slot 2; and for HARQ-ID 2, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1, but fails in decoding the UCI received in slot 2.

The base station successfully performs LBT in slot 7, and uses DFI to feed back HARQ-ACK to the UE, where the HARQ-ID bitmap is 1100000000000000, and the UCI decoding error (or the same RV retransmission indication) is 1.

The UE receives the DFI in slot 7, and learns that HARQ-IDs 0 and 1 are successfully decoded and other HARQ-IDs are incorrectly decoded through the HARQ-ID bitmap. As the UE in this embodiment merely transmits HARQ-IDs 0, 1, and 2, the UE further determines that the HARQ-ID of the decoding error is 2. The UCI decoding error (or the same RV retransmission indication) in DFI is 1, and the UE may select the same RVID as the previous transmission when performing the scheduling-free retransmission for HARQ-ID, that is, the RVID is 0.

As mentioned above, for a scenario of one transport block in feLAA, AUL-DFI includes 16-bit HARQ-ACK Bitmap and 2-bit TPC. The DFI in the unlicensed frequency band of 5G NR must at least include this information. When the uplink scheduling-free transmission in the unlicensed frequency band of 5G NR supports CBG, DFI should also introduce CBG-level feedback. Each transport block in the unlicensed frequency band of 5G NR can be configured with a maximum of 8 CBGs, and 16 HARQ requires 128 bits for feedback.

However, the number of DFI bits in the unlicensed frequency band of 5G NR is limited (it may need to be multiplexed with a certain DCI format to reduce complexity of blind detection of the UE), and cannot be expanded without limitation. Embodiments of the present disclosure provide following methods to solve the above problem.

Method 1 is using transport block-level HARQ-ACK feedback and partial CBG-level HARQ-ACK feedback.

All available HARQ processes are divided into M groups, and the base station selects one group to feed back CBG-level HARQ-ACK according to the received PUSCH decoding situation and HARQ-ID. M needs to meet the following constraints:

$$\left(\lceil \log_2 M \rceil + \left\lceil \frac{N_{HARQ\text{-}ID}}{M} \right\rceil \times N_{CBG} \right) \le N,$$

where $N_{HARQ\text{-}ID}$ is the total number of HARQ processes available for scheduling-free, $N_{CBG}$ is the maximum number of CBGs configured for scheduling-free uplink transmission for the base station. M is configured by the base station to the UE through high-level signaling or is a default value defined by a protocol. The HARQ process in each group may be configured through high-level signaling, or through a predefined grouping method.

In other embodiments, the transport block-level HARQ-ACK feedback is optional, and the DFI may include transport block-level HARQ-ACK feedback or not include transport block-level HARQ-ACK feedback. Whether to include transport block-level HARQ-ACK feedback may affect the number of bits available for CBG-level feedback.

For the above method 1, there are following specific examples.

The number of available processes is 16, the maximum number of CBGs configured by the base station for scheduling-free uplink transmission is 4. DFI uses a transport block-level HARQ-ACK bitmap to feed back the transport block-level HARQ-ACK of all HARQ processes, and the number of bits in DFI that can be used for the CBG-level HARQ-ACK feedback is 27. According to the above formula, the minimum value of M is 3.

The base station configures M to 4 through high-level signaling, and all 16 HARQ processes are available. The available HARQ processes in the first group are 0, 1, 2 and 3; the available HARQ processes in the second group are 4, 5, 6 and 7; the available HARQ processes in the third group are 8, 9, 10 and 11; the available HARQ processes in the fourth group are 12, 13, 14 and 15. 2 bits in DFI are used to indicate which group of HARQ-ACK is being fed back, where 00 represents the first group, 01 represents the second group, 10 represents the third group, and 11 represents the fourth group.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 1, and HARQ-ID of a PUSCH transmitted in slot 2 is 2. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 1, the scheduling-free retransmission timer starts from slot 2; and for HARQ-ID 2, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1. When decoding slot 2, the base station incorrectly decodes CBGs 0 and 1, and correctly decodes CBGs 2 and 3.

The base station successfully performs LBT in slot 7, and uses DFI to feed back HARQ-ACK to the UE, where the transport block-level HARQ-ID bitmap is 1100000000000000, and the CBG-level feedback information is 001111111100110000, where the first 2 bits ('00') represent the first group, and the last 16 bits represent the CBG-level HARQ-ACK feedback bitmap.

The UE receives the DFI in slot 7, and learns that HARQ-IDs 0 and 1 are successfully decoded, and CBGs 0 and 1 of HARQ-ID 2 are incorrectly decoded while CBGs 2 and 3 of HARQ-ID 2 are correctly decoded. The UE may merely retransmit CBGs 0 and 1 of HARQ-ID 2 when performing the scheduling-free retransmission.

Method 2 is using transport block-level HARQ-ACK feedback and CBG-level HARQ-ACK feedback.

All available HARQ processes are divided into M groups, and the base station selects one group to feed back CBG-level HARQ-ACK according to the received PUSCH decoding situation and HARQ-ID. M needs to meet the following constraints:

$$(M \times N_{CBG}) \leq N,$$

Where $N_{CBG}$ is the maximum number of CBGs configured for scheduling-free uplink transmission for the base station. M is configured by the base station to the UE through high-level signaling or is a default value defined by a protocol. The HARQ process in each group may be configured through high-level signaling, or through a predefined grouping method.

The CBG-level HARQ-ACK feedback of DFI may logically AND the CBGs corresponding to all transport blocks in each group. Feedback bits of CBG-level HARQ-ACK in DFI are $M \times N_{CBG}$.

In other embodiments, the transport block-level HARQ-ACK feedback is optional, and the DFI may include transport block-level HARQ-ACK feedback or not include transport block-level HARQ-ACK feedback. Whether to include transport block-level HARQ-ACK feedback may affect the number of bits available for CBG-level feedback.

For the above method 2, there is a following specific example.

The number of available processes is 16, the maximum number of CBGs configured by the base station for scheduling-free uplink transmission is 4. DFI uses a transport block-level HARQ-ACK bitmap to feed back the transport block-level HARQ-ACK of all HARQ processes, and the number of bits in DFI that can be used for the CBG-level HARQ-ACK feedback is 27. According to the above formula, the maximum value of M is 6.

The base station configures M to 4 through high-level signaling, and all 16 HARQ processes are available. The available HARQ processes in the first group are 0, 1, 2 and 3; the available HARQ processes in the second group are 4, 5, 6 and 7; the available HARQ processes in the third group are 8, 9, 10 and 11; the available HARQ processes in the fourth group are 12, 13, 14 and 15. 2 bits in DFI are used to indicate which group of HARQ-ACK is being fed back, where 00 represents the first group, 01 represents the second group, 10 represents the third group, and 11 represents the fourth group.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 1, and HARQ-ID of a PUSCH transmitted in slot 2 is 2. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 1, the scheduling-free retransmission timer starts from slot 2; and for HARQ-ID 2, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1. When decoding slot 2, the base station incorrectly decodes CBGs 0 and 1, and correctly decodes CBGs 2 and 3.

The base station successfully performs LBT in slot 7, and uses DFI to feedback HARQ-ACK to the UE, where the transport block-level HARQ-ID bitmap is 1100000000000000, and the CBG-level feedback information is 001111111100110000.

The UE receives the DFI in slot 7, and learns that HARQ-IDs 0 and 1 are successfully decoded, while HARQ-ID 2 fails to be decoded through the transport block-level HARQ-ACK. Through the CBG-level HARQ-ACK feedback, the UE further learns that CBGs 0 and 1 of HARQ-ID 2 are incorrectly decoded while CBGs 2 and 3 of HARQ-ID 2 are correctly decoded. The UE may merely retransmit CBGs 0 and 1 of HARQ-ID 2 when performing the scheduling-free retransmission.

The transport block-level HARQ-ACK feedback is optional. In another embodiment, merely the CBG-level HARQ-ACK feedback may be used. There is a following example for reference.

The number of available processes is 16, the maximum number of CBGs configured by the base station for scheduling-free uplink transmission is 4. DFI does not use a transport block-level HARQ-ACK bitmap to feed back the transport block-level HARQ-ACK of all HARQ processes, and the number of bits in DFI that can be used for the CBG-level HARQ-ACK feedback is 27. According to the above formula, the maximum value of M is 6.

The base station configures M to 4 through high-level signaling, and all 16 HARQ processes are available. The available HARQ processes in the first group are 0, 1, 2 and 3; the available HARQ processes in the second group are 4, 5, 6 and 7; the available HARQ processes in the third group are 8, 9, 10 and 11; the available HARQ processes in the fourth group are 12, 13, 14 and 15. 2 bits in DFI are used to indicate which group of HARQ-ACK is being fed back, where 00 represents the first group, 01 represents the second group, 10 represents the third group, and 11 represents the fourth group.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 4, and HARQ-ID of a PUSCH transmitted in slot 2 is 8. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 4, the scheduling-free retransmission timer starts from slot 2; and for HARQ-ID 8, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1. When decoding slot 2, the base station incorrectly decodes CBGs 0 and 1, and correctly decodes CBGs 2 and 3.

The base station successfully performs LBT in slot 7, and uses DFI to feed back HARQ-ACK to the UE, where the CBG-level HARQ-ACK feedback is 1111111100110000.

The UE receives the DFI in slot 7, and learns, from the CBG-level HARQ-ACK, that the first and second groups of HARQ-IDs are successfully decoded, while CBGs 0 and 1 of the third group of HARQ-ID are incorrectly decoded and CBGs 2 and 3 of the third group of HARQ-ID are correctly decoded. The UE further determines, according to the HARQ-ID information transmitted by itself, that HARQ-IDs 0 and 1 are successfully decoded and HARQ-ID 2 is not successfully decoded, where CBGs 0 and 1 of HARQ-ID 2 are incorrectly decoded while CBGs 2 and 3 of HARQ-ID 2 are correctly decoded. The UE may merely retransmit CBGs 0 and 1 of HARQ-ID 2 when performing the scheduling-free retransmission.

Method 3 is using transport block-level HARQ-ACK feedback and partial CBG-level HARQ-ACK feedback.

The base station selects at most P HARQs to feed back the CBG-level HARQ-ACK according to the received PUSCH decoding conditions and HARQ-ID. P needs to meet the following constraints, $$P \times (N_{CBG} + \lceil \log_2(N_{HARQ\text{-}ID}) \rceil) \leq N,$$

where $N_{HARQ\text{-}ID}$ is the total number of HARQ processes available for scheduling-free, $N_{CBG}$ is the maximum number of CBGs configured for scheduling-free uplink transmission for the base station. P is configured by the base station to the UE through high-level signaling or is a default value defined by a protocol.

The DFI includes transport block-level HARQ-ACK feedback, and the number of the CBG-level HARQ-ACK feedback bits is $P \times (N_{CBG} + \lceil \log_2(N_{HARQ\text{-}ID}) \rceil)$.

For the above method 3, there is a following specific example.

The number of available processes is 16, the maximum number of CBGs configured by the base station for scheduling-free uplink transmission is 4. DFI uses a transport block-level HARQ-ACK bitmap to feed back the transport block-level HARQ-ACK of all HARQ processes, and the number of bits in DFI that can be used for the CBG-level HARQ-ACK feedback is 27. According to the above formula, the maximum value of P is 3.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 1, and HARQ-ID of a PUSCH transmitted in slot 2 is 2. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 1, the scheduling-free retransmission timer starts from slot 2; and for HARQ-ID 2, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1. When decoding slot 2, the base station incorrectly decodes CBGs 0 and 1, and correctly decodes CBGs 2 and 3.

The base station successfully performs LBT in slot 7, and uses DFI to feed back HARQ-ACK to the UE, where the transport block-level HARQ-ID bitmap is 1100000000000000, and the CBG-level feedback information is 001000110100000010000000. The 24 bits are divided into 3 groups, the first 4 bits of each group indicate HARQ-ID, and the last 4 bits indicate specific CBG-level HARQ-ACK. The first four bits 0010 indicate that the HARQ-ID is 2, and the fifth to eighth bits 0011 indicate that CBGs 0 and 1 are incorrectly decoded while CBGs 2 and 3 are correctly decoded.

The UE receives the DFI in slot 7, and learns that HARQ-IDs 0 and 1 are successfully decoded, while CBGs 0 and 1 of HARQ-ID 2 are incorrectly decoded and CBGs 2 and 3 of HARQ-ID 2 are correctly decoded. The UE may merely retransmit CBGs 0 and 1 of HARQ-ID 2 when performing the scheduling-free retransmission.

On this basis, CBG bundling may be used to further reduce the number of bits required for HARQ-ACK feedback.

In some embodiments, at least one CBG group is formed, each CBG group includes one or more CBGs, and in a CBG-level HARQ-ACK feedback, each bit indicates whether a CBG group is successfully decoded. If any CBG in a CBG group needs to be retransmitted, the bit indicates that the CBG group needs to be retransmitted, and if all CBGs in a CBG group do not need to be retransmitted, the bit indicates that the CBG group does not need to be retransmitted.

There are some methods for determining the number of bits fed back by each HARQ process.

A. The available HARQ processes are divided into 2 groups, where the number of HARQ processes in the first group is N mod $N_{HARQ-ID}$, and the number of HARQ processes in the second group is $N_{HARQ-ID}$–N mod $N_{HARQ-ID}$. The number of bits fed back for each HARQ process in the first group is $\lceil N/N_{HARQ-ID} \rceil$, and the number of bits fed back for each HARQ process in the second group is $\lfloor N/N_{HARQ-ID} \rfloor$. The number of CBG-level HARQ-ACK feedback bits is N.

B. HARQs may not be grouped, and the number of bits fed back for each HARQ process is $\lfloor N/N_{HARQ-ID} \rfloor$. The number of CBG-level HARQ-ACK feedback bits is $\lfloor N/N_{HARQ-ID} \rfloor \times N_{HARQ-ID}$.

Among them, $N_{HARQ-ID}$ is the total number of HARQ processes available for scheduling-free, $N_{CBG}$ is the maximum number of CBGs used for scheduling-free uplink transmission configured by the base station.

Based on the number of bits (X) fed back by each HARQ process, the CBGs of the transport block corresponding to each process are divided into X groups. After grouping, the following constraints are met: the number of CBGs in a former group is not less than the number of CBGs in a latter group, and a difference between the number of CBGs in the former group and the number of CBGs in the latter group is no more than 1. Logic AND operation is performed on the HARQ-ACK feedback of the CBGs in each group.

For CBG bundling, there is a following example for reference.

The number of available processes for the UE configured by the base station is 8, including processes 0, 1, 2, 3, 4, 5, 6 and 7. The maximum number of CBGs configured by the base station for scheduling-free uplink transmission is 4. The number of bits in DFI that can be used for the CBG-level HARQ-ACK feedback is 27.

According to the above formula in B, the number of bits fed back for each HARQ process is $\lfloor N/N_{HARQ-ID} \rfloor = 3$.

CBGs are divided into 3 groups, where the first group includes CBGs 0 and 1, the second group includes CBG 2, and the third group includes CBG 3. CBGs in the same group need to be bundled, that is, CBGs 0 and 1 of the first group are bundled, while the second and third groups do not need to be bundled.

The UE succeeds in LBT in slot 0, and continuously transmits PUSCH and UCI in a scheduling-free manner. HARQ-ID of a PUSCH transmitted in slot 0 is 0, HARQ-ID of a PUSCH transmitted in slot 1 is 1, and HARQ-ID of a PUSCH transmitted in slot 2 is 2. RVID of 0 is adopted.

A scheduling-free retransmission timer on the UE is 10 ms. In this case, SCS of 15 KHz is used, and length of a slot is 1 ms. The scheduling-free retransmission timer starts after the PUSCH corresponding to each HARQ-ID is transmitted. For HARQ-ID 0, the scheduling-free retransmission timer starts from slot 1; for HARQ-ID 1, the scheduling-free retransmission timer starts from slot 2; and for HARQ-ID 2, the scheduling-free retransmission timer starts from slot 3.

Assuming that the base station receives the PUSCH and UCI from the UE in slots 0, 1 and 2 in a scheduling-free manner, the base station obtains UE-ID information through UE specific DMRS, and successfully decodes the UCI and PUSCH of slots 0 and 1. When decoding slot 2, the base station incorrectly decodes CBGs 0 and 2, and correctly decodes CBGs 1 and 3.

The base station successfully performs LBT in slot 7, and uses DFI to feed back HARQ-ACK of 111111001000000000000000 including 24 bits to the UE.

The UE receives the DFI in slot 7, and learns that HARQ-IDs 0 and 1 are successfully decoded, while CBGs 0, 1 and 2 of HARQ-ID 2 are incorrectly decoded and CBG 3 of HARQ-ID 2 is correctly decoded. The UE may merely retransmit CBGs 0, 1 and 2 of HARQ-ID 2 when performing the scheduling-free retransmission.

In some embodiments, in a case that the base station configures multiple scheduling-free resources for the UE, and the UE can simultaneously use the multiple scheduling-free resources to transmit the uplink data, the base station indicates a particular resource in the DCI.

If the number of scheduling-free resources that the base station configures for the UE to transmit PUSCH at the same time is N, $\lceil \log_2(N) \rceil$ bits in the DCI are required to indicate for the base station which scheduling-free resource is received.

In S106, the UE receives the DFI.

As described above, the DFI includes the first information.

In S107, the UE uses the first information to determine HARQ-ID of a transport block where the CBG that needs to be retransmitted is located, and a sequence number of the CBG that needs to be retransmitted in a HARQ of the transport block where the CBG that needs to be retransmitted is located.

In S108, the UE performs scheduling-free retransmission.

By the above embodiments, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

As described below, an embodiment of the present disclosure provides a data transmission method. The method may be performed by a UE.

Figure 3:
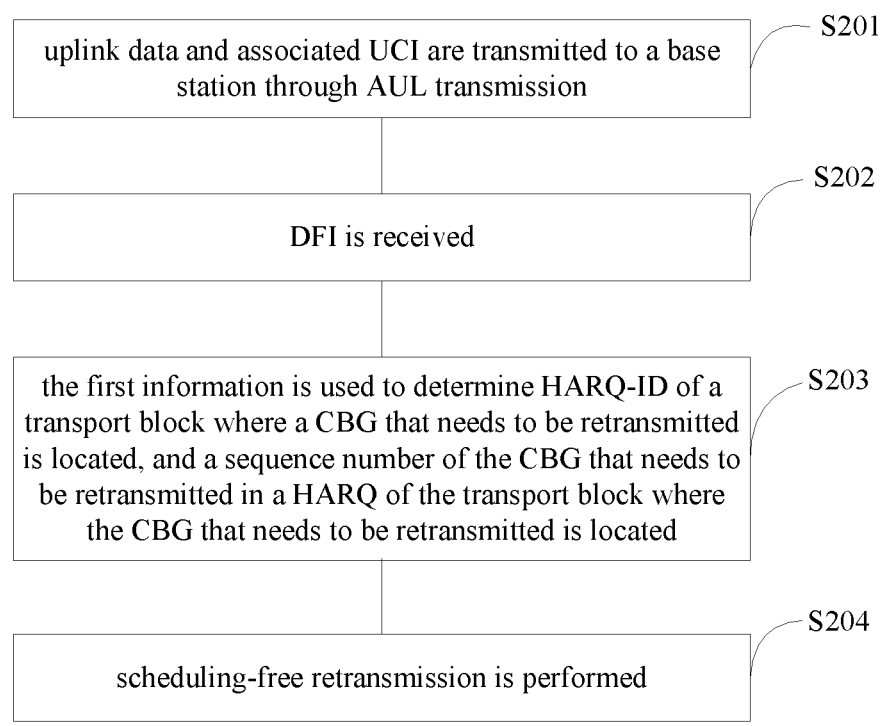
FIG. 3 is a flow chart of a data transmission method according to an embodiment.

Referring to the flow chart of the data transmission method as shown in FIG. 3, parts that are the same as or similar to the embodiment as shown in FIG. 2 are not described in detail here.

In S201, uplink data and associated UCI are transmitted to a base station through AUL transmission.

In an unlicensed frequency band of 5G NR, the UE transmits uplink data and associated UCI to the base station through AUL transmission, and the base station can identify the UE transmitting the uplink data through UE specific DMRS.

The UCI includes HARQ-ID, NDI and RVID associated with the uplink data.

Before transmitting the uplink data and the associated UCI to the base station through AUL transmission, the UE further performs LBT and succeeds in the LBT.

In S202, DFI is received.

The UE receives the DFI which includes first information.

In some embodiments, the first information includes: a transport block level HARQ-ACK feedback, and a CBG-level HARQ-ACK feedback of a transport block or a transport block group where the CBG that fails to be decoded is located, wherein the transport block group includes one or more transport blocks.

In some embodiments, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

In S203, the first information is used to determine HARQ-ID of a transport block where a CBG that needs to be retransmitted is located, and a sequence number of the CBG that needs to be retransmitted in a HARQ of the transport block where the CBG that needs to be retransmitted is located.

In S204, scheduling-free retransmission is performed.

By the above embodiments, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCCH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

As described below, an embodiment of the present disclosure provides a data transmission method. The method may be performed by a base station.

Figure 4:
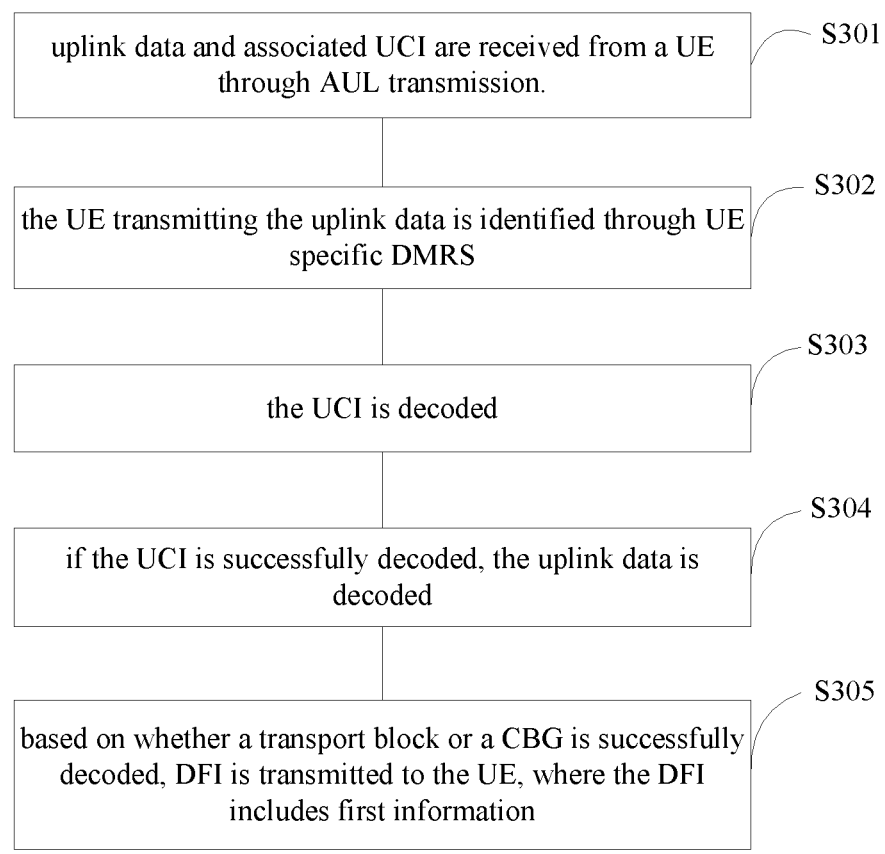
FIG. 4 is a flow chart of a data transmission method according to an embodiment.

Referring to the flow chart of the data transmission method as shown in FIG. 4, parts that are the same as or similar to the embodiment as shown in FIG. 2 are not described in detail here.

In S301, uplink data and associated UCI are received from a UE through AUL transmission.

In an unlicensed frequency band of 5G NR, the base station receives uplink data and associated UCI from a UE through AUL transmission.

The UCI includes HARQ-ID, NDI and RVID associated with the uplink data.

Before transmitting the uplink data and the associated UCI to the base station through AUL transmission, the UE further performs LBT and succeeds in the LBT.

In S302, the UE transmitting the uplink data is identified through UE specific DMRS.

In S303, the UCI is decoded.

In S304, if the UCI is successfully decoded, the uplink data is decoded.

In S305, based on whether a transport block or a CBG is successfully decoded, DFI is transmitted to the UE, where the DFI includes first information.

In some embodiments, the first information includes: a transport block level HARQ-ACK feedback, and a CBG-level HARQ-ACK feedback of a transport block or a transport block group where the CBG that fails to be decoded is located, wherein the transport block group includes one or more transport blocks.

In some embodiments, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

By the above embodiments, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCCH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

As described below, an embodiment of the present disclosure provides a data transmission apparatus.

Figure 5:
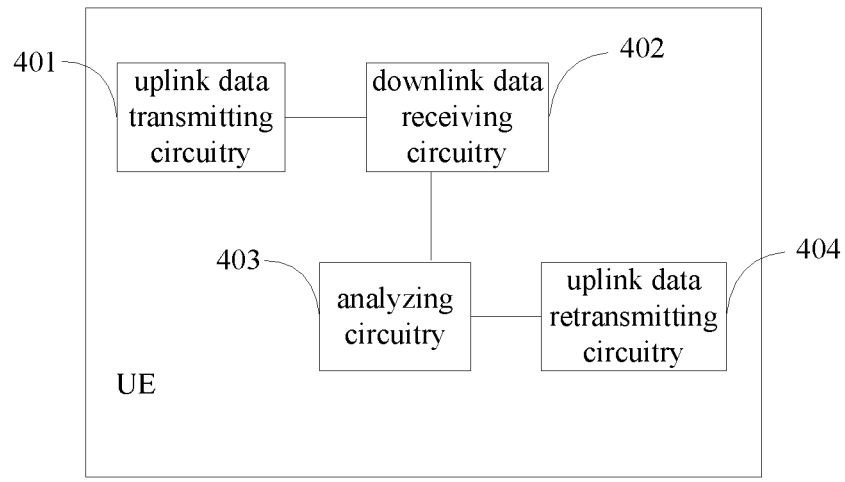
FIG. 5 is a structural diagram of a data transmission apparatus according to an embodiment.

Refer to the structural diagram of the data transmission apparatus as shown in FIG. 5.

The data transmission apparatus includes an uplink data transmitting circuitry 401, a downlink data receiving circuitry 402, an analyzing circuitry 403 and an uplink data retransmitting circuitry 404.

The uplink data transmitting circuitry 401 is configured to: in an unlicensed frequency band of 5G NR, transmit uplink data and associated UCI to a base station through AUL transmission, wherein the base station is capable of identifying a UE transmitting the uplink data through UE specific DMRS.

The downlink data receiving circuitry 402 is configured to receive DFI which includes first information.

The analyzing circuitry 403 is configured to use the first information to determine HARQ-ID of a transport block where a CBG that needs to be retransmitted is located, and a sequence number of the CBG that needs to be retransmitted in a HARQ of the transport block where the CBG that needs to be retransmitted is located.

The uplink data retransmitting circuitry 404 is configured to perform scheduling-free retransmission.

By the above embodiments, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

In some embodiments, before the uplink data and the associated UCI are transmitted to the base station through AUL transmission, LBT is performed and succeeds.

In some embodiments, the UCI includes HARQ-ID, NDI and RVID associated with the uplink data.

In some embodiments, the first information includes: a transport block level HARQ-ACK feedback, and a CBG-level HARQ-ACK feedback of a transport block or a transport block group where the CBG that fails to be decoded is located, wherein the transport block group includes one or more transport blocks.

In some embodiments, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

As described below, an embodiment of the present disclosure provides a data transmission apparatus.

Figure 6:
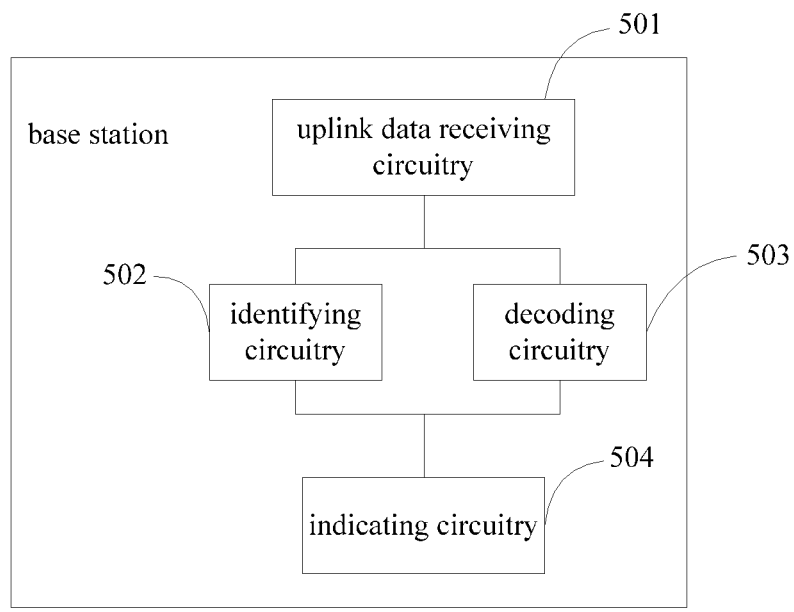
FIG. 6 is a structural diagram of a data transmission apparatus according to an embodiment.

Refer to the structural diagram of the data transmission apparatus as shown in FIG. 6.

The data transmission apparatus includes an uplink data receiving circuitry 501, an identifying circuitry 502, a decoding circuitry 503 and an indicating circuitry 504.

The uplink data receiving circuitry 501 is configured to: in an unlicensed frequency band of 5G NR, receive uplink data and associated UCI from a UE through AUL transmission.

The identifying circuitry 502 is configured to identify the UE through UE specific DMRS.

The decoding circuitry 503 is configured to: decode the UCI, and if the UCI is successfully decoded, decode the uplink data.

The indicating circuitry 504 is configured to: based on whether a transport block or a CBG is successfully decoded, transmit DFI to the UE, wherein the DFI includes first information, and the UE is capable of using the first information to determine HARQ-ID of a transport block where the CBG that needs to be retransmitted is located, and a sequence number of the CBG that needs to be retransmitted in a HARQ of the transport block where the CBG that needs to be retransmitted is located.

By the above embodiments, in an unlicensed frequency band of 5G NR, for a data transmission mode of AUL transmission, the base station uses UE specific DMRS to identify a UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

In some embodiments, before transmitting the uplink data and the associated UCI to the base station through AUL transmission, the UE further performs LBT and succeeds in the LBT.

In some embodiments, the UCI includes HARQ-ID, NDI and RVID associated with the uplink data.

In some embodiments, the first information includes: a transport block level HARQ-ACK feedback, and a CBG-level HARQ-ACK feedback of a transport block or a transport block group where the CBG that fails to be decoded is located, wherein the transport block group includes one or more transport blocks.

In some embodiments, at least one CBG group is formed, each CBG group includes one or more CBGs, and in a CBG-level HARQ-ACK feedback, each bit indicates whether a CBG group is successfully decoded, wherein if any CBG in a CBG group fails to be successfully decoded, the bit indicates that the CBG group is not successfully decoded, and if all CBGs in a CBG group are successfully decoded, the bit indicates that the CBG group is successfully decoded.

As described below, an embodiment of the present disclosure provides a UE.

The UE supports an unlicensed frequency band of 5G NR and further includes the above data transmission apparatus as shown in FIG. 5. Therefore, in an unlicensed frequency band of 5G NR, for a data transmission mode of AUL transmission, the base station uses UE specific DMRS to identify the UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

As described below, an embodiment of the present disclosure provides a base station.

The UE supports an unlicensed frequency band of 5G NR and further includes the above data transmission apparatus as shown in FIG. 6. Therefore, in an unlicensed frequency band of 5G NR, for a data transmission mode of AUL transmission, the base station uses UE specific DMRS to identify the UE transmitting uplink data, and decodes the uplink data in the case of successful UCI decoding. Based on whether the decoding of a transmission block or a CBG is successful, the base station transmits DFI to the UE, where the DFI includes first information used to indicate a location of the successfully decoded CBG. The UE determines, by using the first information, HARQ-ID of the transport block where the CBG that needs to be retransmitted is located, and a sequence number of the CBG that needs to be retransmitted in a HARQ of the transport block where the CBG is located, so as to achieve scheduling-free retransmission. When receiving the indication, the UE may select a same RV as the previous transmission for the scheduling-free retransmission of PUCSH with NACK feedback. If the DFI indicates that no retransmission is required, the UE may select other RV versions to obtain an IR gain.

Further, for a situation where the number of DFI bits is limited, the first information includes a transport block level HARQ-ACK feedback, and a CBG-level HARQ-ACK feedback of a transport block or a transport block group where the CBG that fails to be decoded is located, where the transport block group includes one or more transport blocks, thereby realizing a CBG-level feedback in a situation where the number of DFI bits is limited.

Those skilled in the art could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method, comprising:
in an unlicensed frequency band of 5G New Radio (NR), a User Equipment (UE) transmitting uplink data and associated Uplink Control Information (UCI) to a base station through Autonomous UpLink (AUL) transmission;
the base station identifying the UE through UE specific Demodulation Reference Signal (DMRS);
the base station decoding the UCI;
in response to the UCI being not successfully decoded, the base station decoding the uplink data;
based on whether a transport block or a Code Block Group (CBG) is successfully decoded, the base station transmitting Downlink Feedback Information (DFI) to the UE, wherein the DFI comprises first information that is used to indicate a location of the successfully decoded CBG;
the UE receiving the DFI;
the UE using the first information to determine Hybrid Automatic Repeat reQuest-IDentity (HARQ-ID) of a transport block where the CBG that needs to be retransmitted is located, and a sequence number of the CBG that needs to be retransmitted in a HARQ of the transport block where the CBG that needs to be retransmitted is located; and
the UE performing scheduling-free retransmission for the CBG.

2. The data transmission method according to claim 1, wherein the first information comprises: a transport block level HARQ-ACK feedback, and a CBG-level HARQ-ACK feedback of a transport block or a transport block group where the CBG that fails to be decoded is located, wherein the transport block group comprises one or more transport blocks.

3. The data transmission method according to claim 1, wherein at least one CBG group is formed, each CBG group comprises one or more CBGs, and in a CBG-level HARQ-ACK feedback, each bit indicates whether a CBG group is successfully decoded, wherein in response to any CBG in a CBG group failing to be successfully decoded, the bit indicates that the CBG group is not successfully decoded, and in response to all CBGs in a CBG group being successfully decoded, the bit indicates that the CBG group is successfully decoded.

4. The data transmission method according to claim 1, wherein before transmitting uplink data and associated UCI to a base station through AUL transmission, the method further comprises:
performing Listen Before Talk (LBT) and succeeding in the LBT.

5. The data transmission method according to claim 1, wherein the UCI comprises HARQ-ID, New Data Indicator (NDI) and Redundancy Version IDentity (RVID) associated with the uplink data.

6. A data transmission method, comprising:
   in an unlicensed frequency band of 5G New Radio (NR), transmitting uplink data and associated Uplink Control Information (UCI) to a base station through Autonomous UpLink (AUL) transmission, wherein the base station is capable of identifying a User Equipment (UE) transmitting the uplink data through UE specific Demodulation Reference Signal (DMRS);
   receiving Downlink Feedback Information (DFI) which comprises first information;
   using the first information to determine Hybrid Automatic Repeat reQuest-IDentity (HARQ-ID) of a transport block where a Code Block Group (CBG) that needs to be retransmitted is located, and a sequence number of the CBG that needs to be retransmitted in a HARQ of the transport block where the CBG that needs to be retransmitted is located; and
   performing scheduling-free retransmission for the CBG;
   wherein during the above process, in response to the UCI being not successfully decoded, the base station decodes the uplink data, and transmits the DFI to the UE based on whether the transport block or the CBG is successfully decoded.

7. The data transmission method according to claim 6, wherein the first information comprises: a transport block level HARQ-ACK feedback, and a CBG-level HARQ-ACK feedback of a transport block or a transport block group where the CBG that fails to be decoded is located, wherein the transport block group comprises one or more transport blocks.

8. The data transmission method according to claim 6, wherein at least one CBG group is formed, each CBG group comprises one or more CBGs, and in a CBG-level HARQ-ACK feedback, each bit indicates whether a CBG group is successfully decoded, wherein in response to any CBG in a CBG group failing to be successfully decoded, the bit indicates that the CBG group is not successfully decoded, and in response to all CBGs in a CBG group being successfully decoded, the bit indicates that the CBG group is successfully decoded.

9. The data transmission method according to claim 6, wherein before transmitting uplink data and associated UCI to a base station through AUL transmission, the method further comprises:
   performing Listen Before Talk (LBT) and succeeding in the LBT.

10. The data transmission method according to claim 6, wherein the UCI comprises HARQ-ID, New Data Indicator (NDI) and Redundancy Version IDentity (RVID) associated with the uplink data.

11. A data transmission method, comprising:
    in an unlicensed frequency band of 5G New Radio (NR), receiving uplink data and associated Uplink Control Information (UCI) from a User Equipment (UE) through Autonomous UpLink (AUL) transmission;
    identifying the UE through UE specific Demodulation Reference Signal (DMRS);
    decoding the UCI;
    in response to the UCI being not successfully decoded, decoding the uplink data; and
    based on whether a transport block or a Code Block Group (CBG) is successfully decoded, transmitting Downlink Feedback Information (DFI) to the UE, wherein the DFI comprises first information, and the UE is capable of using the first information to determine Hybrid Automatic Repeat reQuest-IDentity (HARQ-ID) of a transport block where the CBG that needs to be retransmitted is located, and a sequence number of the CBG that needs to be retransmitted in a HARQ of the transport block where the CBG that needs to be retransmitted is located.

12. The data transmission method according to claim 11, wherein the first information comprises: a transport block level HARQ-ACK feedback, and a CBG-level HARQ-ACK feedback of a transport block or a transport block group where the CBG that fails to be decoded is located, wherein the transport block group comprises one or more transport blocks.

13. The data transmission method according to claim 11, wherein at least one CBG group is formed, each CBG group comprises one or more CBGs, and in a CBG-level HARQ-ACK feedback, each bit indicates whether a CBG group is successfully decoded, wherein in response to any CBG in a CBG group failing to be successfully decoded, the bit indicates that the CBG group is not successfully decoded, and in response to all CBGs in a CBG group being successfully decoded, the bit indicates that the CBG group is successfully decoded.

14. The data transmission method according to claim 11, wherein before transmitting the uplink data and the associated UCI to the base station through AUL transmission, the UE further performs Listen Before Talk (LBT) and succeeds in the LBT.

15. The data transmission method according to claim 11, wherein the UCI comprises HARQ-ID, New Data Indicator (NDI) and Redundancy Version IDentity (RVID) associated with the uplink data.

* * * * *